(12) United States Patent
Ichikawa (10) Patent No.: US 7,981,497 B2
(45) Date of Patent: Jul. 19, 2011

(54) HONEYCOMB STRUCTURE AND METHOD OF PRODUCING THE SAME

(75) Inventor: Yukihito Ichikawa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 578 days.

(21) Appl. No.: 11/717,745

(22) Filed: Mar. 14, 2007

(65) Prior Publication Data

US 2007/0243357 A1    Oct. 18, 2007

(30) Foreign Application Priority Data

Mar. 30, 2006 (JP) ................................. 2006-093490
Jan. 17, 2007 (JP) ................................. 2007-007943

(51) Int. Cl.
*B32B 3/12* (2006.01)
(52) U.S. Cl. ....................................... 428/116; 428/117
(58) Field of Classification Search .................. None
See application file for complete search history.

(56) References Cited

U.S. PATENT DOCUMENTS

| 4,840,827 | A | | 6/1989 | Mizutani et al. | |
|---|---|---|---|---|---|
| 5,145,539 | A | * | 9/1992 | Horikawa et al. | 156/89.22 |
| 5,629,067 | A | | 5/1997 | Kotani et al. | |
| 6,316,384 | B1 | * | 11/2001 | Bruck et al. | 502/439 |
| 2005/0025933 | A1 | * | 2/2005 | Masukawa et al. | 428/116 |
| 2005/0106356 | A1 | * | 5/2005 | Ikeshima | 428/116 |
| 2005/0255288 | A1 | * | 11/2005 | Noguchi et al. | 428/116 |

FOREIGN PATENT DOCUMENTS

| CN | 1509209 A | 6/2004 |
|---|---|---|
| EP | 1 533 032 A1 | 5/2005 |
| JP | U 63-144836 | 9/1988 |
| JP | A 05-269388 | 10/1993 |
| JP | B2 2613729 | 2/1997 |

* cited by examiner

*Primary Examiner* — Gordon R Baldwin
(74) *Attorney, Agent, or Firm* — Oliff & Berridge, PLC (57) ABSTRACT

The present invention provides a honeycomb structure in which a coating layer is firmly secured to an outer wall forming a cell structure so that separation of the coating layer is effectively prevented. A honeycomb structure according to the present invention includes a cell structure having a porous partition wall partitioning a plurality of cells serving as fluid channels and an outer wall integrally formed with the partition wall, and a coating layer disposed on the surface of the outer wall forming the cell structure, a depression/protrusion portion and/or a cut portion formed by partially removing the surface of the outer wall being formed on the surface of the outer wall, and the coating layer being disposed to cover the surface of the outer wall.

6 Claims, 5 Drawing Sheets
(2 of 5 Drawing Sheet(s) Filed in Color)

HONEYCOMB STRUCTURE AND METHOD OF PRODUCING THE SAME

BACKGROUND OF THE INVENTION

1. Field of the Invention

The present invention relates to a honeycomb structure and a method of producing the same. More particularly, the present invention relates to a honeycomb structure including a coating layer disposed to cover an outer wall forming a cell structure, and a method of producing the same.

2. Description of Related Art

A ceramic honeycomb structure has been used as a filter for trapping particulate (particularly diesel particulate) contained in automotive exhaust gas (diesel particulate filter: DPF), or a catalyst carrier for supporting a catalyst for purifying nitrogen oxide ($NO_x$), carbon monoxide (CO), hydrocarbons (HC), and the like contained in exhaust gas.

The above honeycomb structure includes a cell structure having a porous partition wall partitioning a plurality of cells serving as fluid channels and an outer wall formed on the outer circumference of the partition wall. The honeycomb structure is produced by extruding a forming clay, drying the extruded product, and firing the dried product, for example. The honeycomb structure (cell structure) inevitably undergoes dimensional errors and deformation in each step. Specifically, since the extruded product is very soft due to the presence of water, a binder, and the like, the extruded product is easily deformed due to its weight. In the case of producing a large product with a diameter of 300 mm, when the product is extruded in the direction perpendicular to the gravitational direction, the outer circumferential cells are crushed due to the weight of the product. On the other hand, when the product is extruded in the direction parallel to the gravitational direction, the lower portion of the formed product is buckled due to the weight of the product. Moreover, since the product may not be uniformly dried or fired in the drying or firing step, deformation may occur due to the difference in shrinkage rate.

It is difficult to hold a honeycomb structure with poor outer circumferential dimensional accuracy at a constant contact pressure when providing the honeycomb structure in a converter casing for providing a DPF or a large carrier. Therefore, technology has been proposed in which a coating layer is disposed to cover an outer wall forming a cell structure to obtain a honeycomb structure with high dimensional accuracy (see patent document 1, for example).

In recent years, it has become necessary to deal with exhaust gas regulations tightened year by year. In view of a demand for reducing fuel consumption while increasing output, a reduction in pressure loss caused by a catalyst carrier or a filter and an increase in exhaust gas purification efficiency have been demanded. In order to deal with such a demand, it is necessary to reduce pressure loss by reducing the thickness of the cell partition wall and to improve purification performance by promptly activating a catalyst after starting an engine. A honeycomb structure having such structural features exhibits low mechanical strength since the partition wall is thin and has a high porosity. In order to prevent deformation, breakage, and the like during use by improving mechanical strength, a method has been proposed in which a reinforcement layer (coating layer) or a shell layer formed of a specific reinforcement material or the like is disposed on the outer circumference of a honeycomb structure (ceramic honeycomb main body) to improve the mechanical strength of the honeycomb structure (see patent document 2, for example).

[Patent document 1] JP-UM-A-63-144836

[Patent document 2] Japanese Patent No. 2613729

SUMMARY OF THE INVENTION

A known honeycomb structure including such a coating layer has a problem in which the coating layer is separated when thermal shock or vibration is encountered since the coating layer exhibits low adhesion to the outer wall forming the cell structure. The patent document 2 discloses a production method in which the outer circumference of a ceramic honeycomb main body integrally extruded without forming an outer wall is coated to form a shell layer. According to this production method, since the partition wall is exposed on the outer circumferential surface, the exposed partition wall may break when handling the ceramic honeycomb main body. This makes it difficult to handle the ceramic honeycomb main body. The outer circumferential portion of the honeycomb structure has been reinforced by suppressing a cell twist utilizing a recent extrusion technology and die technology and improving the reinforcement design such as reinforcing the outer circumferential portion using a rib. However, the accuracy of the external diametrical shape of the honeycomb structure must be further improved since deformation occurs during drying or firing after forming.

The present invention has been achieved in view of the problems of the related-art technologies. An object of the present invention is to provide a honeycomb structure in which a coating layer is firmly secured to an outer wall forming a cell structure so that separation of the coating layer is effectively prevented, and a method of producing the same.

The present invention provides the following honeycomb structure and a method of producing the same.

[1] A honeycomb structure comprising a cell structure having a porous partition wall partitioning a plurality of cells serving as fluid channels and an outer wall integrally formed with the partition wall, and a coating layer disposed on a surface of the outer wall, a depression/protrusion portion and/or a cut portion formed by partially removing the surface of the outer wall being formed on the surface of the outer wall, and the coating layer being disposed to cover at least the depression/protrusion portion and/or the cut portion on the surface of the outer wall.

[2] The honeycomb structure according to [1], wherein the depression/protrusion portion and/or the cut portion on the surface of the outer wall has a depth of 0.1 to 5 mm.

[3] The honeycomb structure according to [1] or [2], wherein the cell structure is formed of a material including cordierite.

[4] The honeycomb structure according to any one of [1] to [3], wherein the coating layer has a thickness of 0.5 to 10 mm.

[5] The honeycomb structure according to any one of [1] to [4], wherein the coating layer includes at least one compound selected from the group consisting of cordierite, alumina, mullite, zirconia, titania, silicon carbide, silicon nitride, aluminum titanate, and silica.

[6] The honeycomb structure according to any one of [1] to [5], wherein the coating layer has a ground outer circumferential surface.

[7] A method of producing a honeycomb structure comprising forming a forming clay including a ceramic raw material to obtain a tubular cell structure having a partition wall partitioning a plurality of cells serving as fluid channels and an outer wall integrally formed with the partition wall, and applying a coating material including a ceramic raw material to the outer wall forming the cell structure to form a coating layer, the outer wall forming the cell structure being formed to have on its surface a depression/protrusion portion and/or a cut portion formed by partially removing the surface of the outer wall.

[8] The method of producing a honeycomb structure according to [7], wherein the depression/protrusion portion in a shape of a protrusion or a groove is formed by processing the surface of the outer wall forming the cell structure.

[9] The method of producing a honeycomb structure according to [7], wherein the cut portion is formed by at least partially removing the outer wall forming the cell structure by reducing the amount of the forming clay supplied to part of a portion forming the outer wall (outer wall forming portion) or blocking flow of the forming clay in a forming die used during forming.

In the honeycomb structure according to the present invention, the coating layer is firmly secured to the outer wall forming the cell structure so that separation of the coating layer is effectively prevented. The method of producing a honeycomb structure according to the present invention allows such a honeycomb structure to be easily and inexpensively produced.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION OF PREFERRED EMBODIMENTS

Preferred embodiments of the present invention are described below. Note that the present invention is not limited to the following embodiments. Various modifications, improvements, and the like may be made on the following embodiments without departing from the spirit and the scope of the present invention based on knowledge of a person skilled in the art.

[1] Honeycomb Structure

Figure 1:
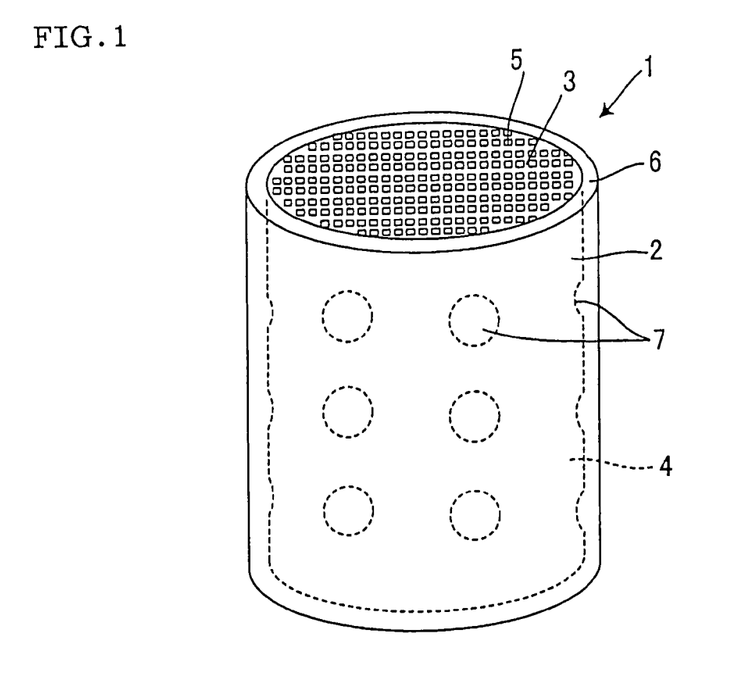
FIG. 1 is an oblique view schematically showing an example of one embodiment of a honeycomb structure according to the present invention.
Figure 2:
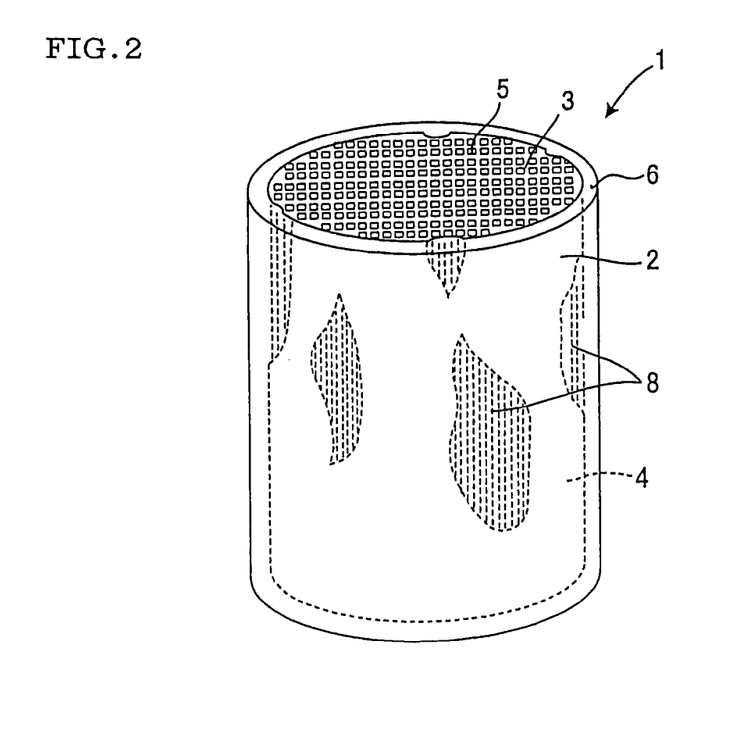
FIG. 2 is an oblique view schematically showing another example of one embodiment of the honeycomb structure according to the present invention.

One embodiment of a honeycomb structure according to the present invention is described below. As shown in FIGS. 1 and 2, a honeycomb structure 1 according to this embodiment includes a cell structure 2 having a porous partition wall 3 partitioning a plurality of cells 5 serving as fluid channels and an outer wall 4 integrally formed with the partition wall 3, and a coating layer 6 disposed on the surface of the outer wall 4 forming the cell structure 2, a depression/protrusion portion 7 and/or a cut portion 8 formed by partially removing the surface of the outer wall 4 being formed on the surface of the outer wall 4 (FIG. 1 shows an example in which the depression/protrusion portions 7 are formed on the surface of the outer wall 4, and FIG. 2 shows an example in which the cut portions 8 are formed on the outer wall 4), and the coating layer 6 being disposed to cover at least the depression/protrusion portion 7 and/or the cut portion 8 on the surface of the outer wall 4. In the honeycomb structure 1 according to this embodiment, the coating layer 6 is firmly secured by causing the coating layer 6 to enter (engage) the depression/protrusion portion 7 and/or the cut portion 8 on the surface of the outer wall 4 forming the cell structure 2, whereby separation of the coating layer 6 is effectively prevented. FIG. 1 is an oblique view schematically showing an example of one embodiment of the honeycomb structure according to the present invention, and FIG. 2 is an oblique view schematically showing another example of one embodiment of the honeycomb structure according to the present invention.

In the honeycomb structure 1 according to this embodiment, the coating layer 6 is firmly secured to the outer wall 4 forming the cell structure 2, whereby separation of the coating layer 6 is effectively prevented. In order to eliminate the effects of a cell twist and the like in the outer circumferential portion, technology may be employed in which the outer circumferential portion of an integrally formed product provided with an outer wall is removed and the outer circumferential surface of the formed product is coated, or an integrally formed product which is not provided with an outer wall is extruded and the outer circumferential surface of the formed product is coated. According to this embodiment, since the strength of the formed product near the outer wall 4 has been increased by suppressing a cell twist utilizing a recent extrusion technology and die technology and improving the reinforcement design such as reinforcing the outer circumferential portion using a rib, a problem in terms of strength does not occur even if the outer wall having a depression/protrusion portion or a cut portion is coated. Moreover, the outer circumferential portion is further reinforced by coating the outer wall to achieve excellent strength. According to a known production method such as a method in which the outer circumference of a cell structure integrally extruded without forming an outer wall is coated (e.g. patent document 2), since the partition wall is exposed on the outer circumferential surface, the exposed partition wall may break during handling, thereby making it difficult to handle the cell structure. In the honeycomb structure 1 according to this embodiment, since the outer wall 4 at least partially remains even if the outer wall 4 has a cut portion, it is easy to handle the honeycomb structure 1.

The honeycomb structure 1 according to this embodiment may be suitably used as a filter for exhaust gas from various internal combustion engines including automotive exhaust gas, a filter for various filter instruments, a heat exchanger unit, or a carrier for chemical reactors such as a reforming catalyst carrier for fuel cells. In particular, since the honeycomb structure 1 according to this embodiment exhibits excellent dimensional accuracy by providing the coating layer 6, the honeycomb structure 1 can be held at a constant contact pressure when providing the honeycomb structure 1 in a converter casing for providing a filter such as a DPF or a large carrier.

The shape of the honeycomb structure 1 according to this embodiment is not particularly limited. As examples of the cross-sectional shape (shape of the bottom surface) of the honeycomb structure 1 perpendicular to the center axis of the pillar-shaped structure, a circle, an oval, an ellipse, a polygon such as a quadrangle, an irregular shape, and the like can be given. The honeycomb structure 1 according to this embodiment preferably has a circular cross-sectional shape.

[1-1] Cell Structure

Figure 3:
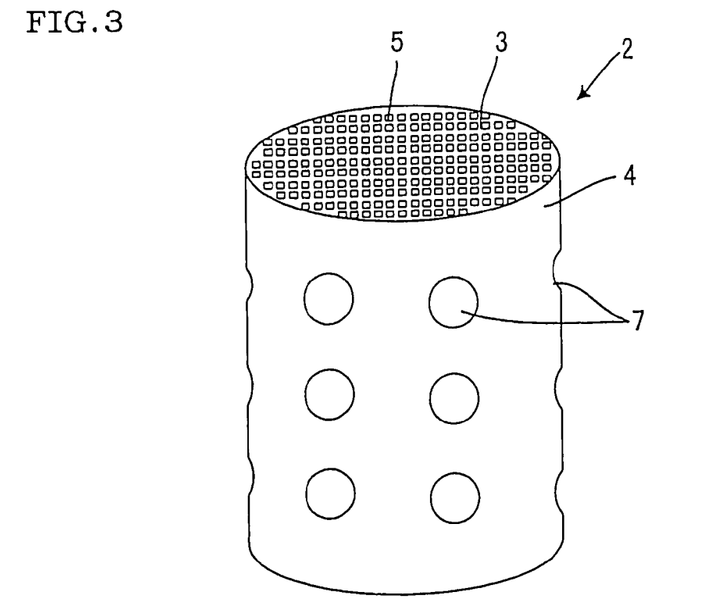
FIG. 3 is an oblique view schematically showing a cell structure used for the honeycomb structure shown in FIG. 1.

As shown in FIG. 3, the cell structure 2 is a tubular porous body having the porous partition wall 3 partitioning the cells 5 serving as fluid channels and the outer wall 4 integrally formed with the partition wall 3. The cell structure 2 may be produced by forming a forming clay including a ceramic raw material. In the honeycomb structure 1 according to this embodiment, the depression/protrusion portion 7 and/or the cut portion 8 formed by partially removing the surface of the outer wall 4 is formed on the surface of the outer wall 4 forming the cell structure 2. FIG. 3 is an oblique view schematically showing an example of the cell structure used for the honeycomb structure shown in FIG. 1.

Figure 4:
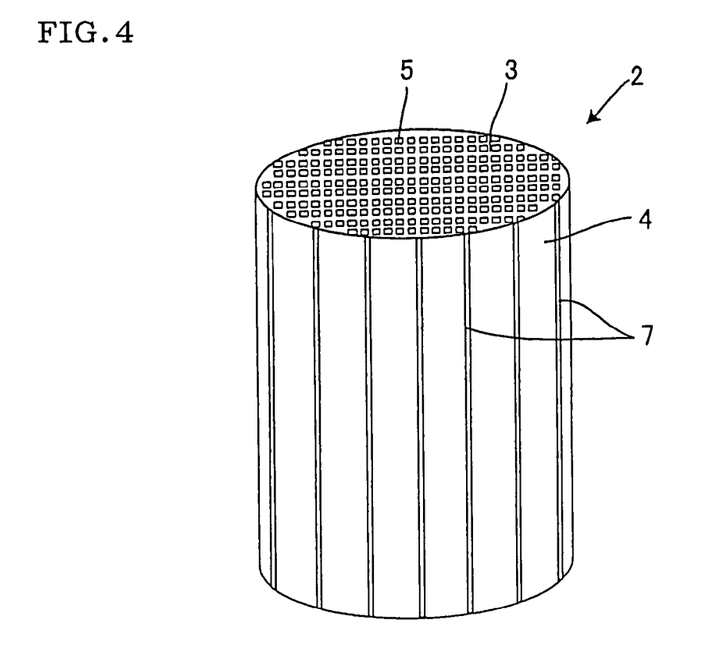
FIG. 4 is an oblique view showing another example of the cell structure.

The depression/protrusion portion on the surface of the outer wall 4 may be formed by processing the surface of the outer wall 4 after producing the cell structure 2 by forming the forming clay. The shape of the depression/protrusion portion 7 is not particularly limited. As examples of the shape of the depression/protrusion portion 7, a depression/protrusion shape such as a protrusion, a depression, or a split as shown in FIG. 3 (FIG. 3 shows the depression/protrusion portions 7 in the shape of a depression), and a groove as shown in FIG. 4 can be given. The depression/protrusion portions 7 may be produced by forming the above protrusions, depressions, grooves, and the like at uniform intervals or irregular intervals. FIG. 4 is an oblique view schematically showing another example of the cell structure.

As shown in FIG. 1, it is preferable to form the depression/protrusion portions 7 on the surface of the outer wall 4 to such an extent that the structural strength of the honeycomb structure 1 is not decreased. The dimensions, the formation locations, and the like of the depression/protrusion portions 7 may be appropriately determined taking into consideration the structure of the cell structure 2, the shape of the cells 5, the porosity, the thickness of the outer wall 4, and the like. For example, the depth of the depression/protrusion portion 7 on the surface of the outer wall 4 is preferably 0.1 to 5 mm, more preferably 0.5 to 3 mm, and particularly preferably 1 to 2 mm, although the depth of the depression/protrusion portion 7 is not particularly limited. If the depth of the depression/protrusion portion 7 is less than 0.1 mm, the inner circumferential surface of the coating layer 6 may not sufficiently enter (engage) the depression/protrusion portion 7. If the depth of the depression/protrusion portion 7 exceeds 5 mm, the thickness of the outer circumferential portion formed of the outer wall 4 and the coating layer 6 may be increased to a large extent, whereby the effective area of the honeycomb structure 1 may be decreased.

Figure 5:
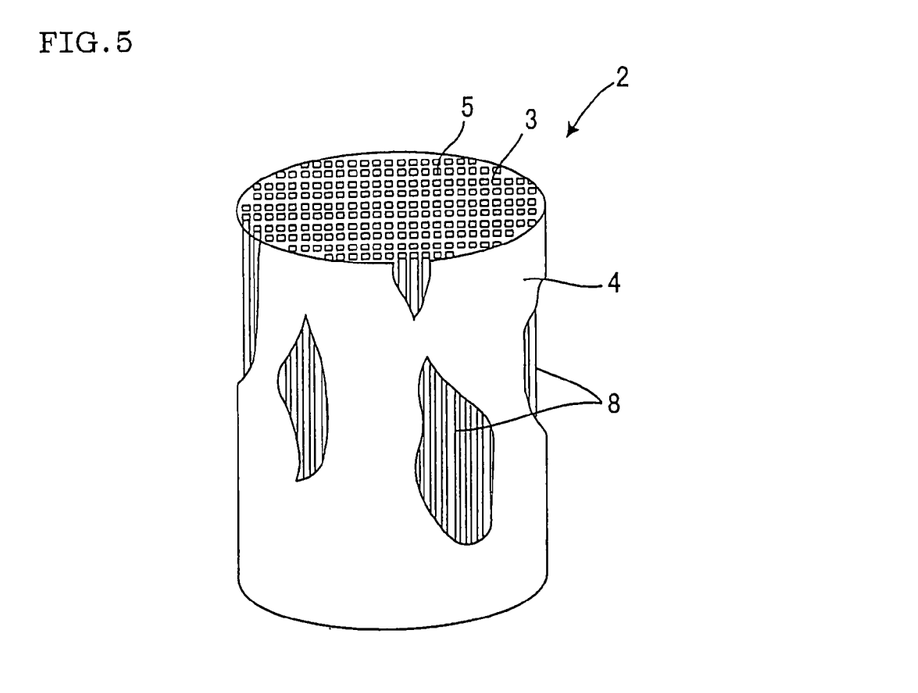
FIG. 5 is an oblique view schematically showing a cell structure used for the honeycomb structure shown in FIG. 2.

As shown in FIG. 5, the cut portion 8 on the surface of the outer wall 4 may be formed by at least partially removing the outer wall 4 by reducing the amount of forming clay supplied to part of a portion forming the outer wall (outer wall forming portion) or blocking the flow of the forming clay in a forming die used during forming. When forming the cut portion 8 by reducing the amount of forming clay supplied or blocking the flow of the forming clay, a portion near the cut portion 8 may be split, whereby the depression/protrusion portion may be formed at the same time with the cut portion 8. When forming the cut portion 8 by reducing the amount of forming clay supplied to part of the outer wall forming portion or blocking the flow of the forming clay, it is preferable to adjust the amount of forming clay used in order to prevent the partition wall 3 forming the cell structure 2 from being removed. The cut portion 8 on the surface of the outer wall 4 may also be formed by partially removing the outer wall 4 of the cell structure 2 using a tool such as a spatula. FIG. 5 is an oblique view schematically showing an example of the cell structure used for the honeycomb structure shown in FIG. 2.

As shown in FIG. 2, it is preferable to form the cut portions 8 on the surface of the outer wall 4 to such an extent that the structural strength of the honeycomb structure 1 is not decreased. The dimensions, the formation locations, and the like of the cut portions 8 may be appropriately determined taking into consideration the structure of the cell structure 2, the shape of the cells 5, the thickness of the outer wall 4, the porosity, and the like. For example, it is preferable to form the cut portions 8 by removing 10 to 90 vol %, more preferably 20 to 80 vol %, and particularly preferably 30 to 70 vol % of the volume of the normal outer wall (i.e. outer wall which does not have the cut portion), although the percentage is not particularly limited. This configuration allows the inner circumferential surface of the coating layer 6 to advantageously enter the cut portions 8 without decreasing the structural strength of the honeycomb structure 1, whereby the coating layer 6 is firmly secured.

As shown in FIGS. 1 and 2, the cross-sectional shape of the cells 5 of the cell structure 2 is not particularly limited. As preferred examples of the cross-sectional shape of the cells 5, a triangle, a quadrangle, a hexagon, an octagon, a circle, and a combination of these shapes can be given. The open area need not be identical for all the cells 5. The cells 5 with different open areas may exist in combination. The thicknesses of the partition wall 3 and the outer wall 4 are not particularly limited. If the thickness of the partition wall 3 or the outer wall 4 is too great, pressure loss when causing a fluid to pass through the honeycomb structure 1 may be increased to a large extent. If the thickness of the partition wall 3 or the outer wall 4 is too small, the strength of the honeycomb structure 1 may become insufficient. The thickness of the partition wall 3 is preferably 10 to 1000 μm, more preferably 50 to 700 μm, and particularly preferably 100 to 500 μm. The thickness of the outer wall 4 is preferably 0.05 to 2 mm, more preferably 0.1 to 1 mm, and particularly preferably 0.3 to 0.7 mm. The cell density of the cell structure 2 is not particularly limited. For example, the cell density of the cell structure 2 is 5 to 250 cells/cm$^2$, and preferably about 15 to 150 cells/cm$^2$.

As the material for the cell structure 2 used for the honeycomb structure 1 according to this embodiment, a porous ceramic may be suitably utilized so that the honeycomb structure 1 can withstand use as a filter such as a DPF. As a particularly preferred example of the porous ceramic, a porous ceramic formed of a material including cordierite can be given.

In the cell structure 2 used for the honeycomb structure 1 according to this embodiment, it is preferable that plugging sections (not shown) be disposed on the ends of at least some of the cells when using the honeycomb structure 1 as a filter. The entire amount of fluid passes through the partition wall of the cells by disposing the plugging sections on both ends of the honeycomb structure so that both ends of the honeycomb structure are plugged in a staggered pattern, whereby the honeycomb structure can be suitably used as a filter. In a general honeycomb structure, the plugging sections are formed in the openings of the cells in a staggered pattern. Note that the arrangement pattern of the plugging sections is not limited thereto. For example, a configuration may be employed in which cells provided with a plugging section and cells which are not provided with a plugging section are collectively provided, respectively, or a configuration may also be employed in which the plugging sections are collectively disposed in rows. Or, the plugging sections may be disposed concentrically or radially. Various patterns may be formed depending on the shape of the partitioned cells.

It is preferable that the cell structure 2 used for the honeycomb structure 1 according to this embodiment have a porosity of 10 to 90%, more preferably 20 to 80%, and particularly preferably 30 to 70%, although the porosity is not particularly limited. This configuration reduces heat capacity while reducing pressure loss, whereby the mechanical strength of the structure can be maintained. The term "porosity" used herein refers to a value measured using a mercury porosimeter.

[1-2] Coating Layer

The coating layer 6 used for the honeycomb structure 1 according to this embodiment is disposed to cover the outer wall 4 forming the cell structure 2. The dimensional accuracy of the outer circumference of the honeycomb structure 1 and the mechanical strength of the honeycomb structure 1 can be improved by providing the coating layer 6. In the honeycomb structure 1 according to this embodiment, since the coating layer 6 is secured by causing the inner circumferential surface of the coating layer 6 to enter (engage) the depression/protrusion portions 7 and/or the cut portions 8 on the outer wall 4, the coating layer 6 is firmly secured to the outer wall 4 forming the cell structure 2, whereby separation of the coating layer 6 is effectively prevented.

The coating layer 6 used for the honeycomb structure 1 according to this embodiment may be formed by applying a coating material including a ceramic raw material to surround the outer wall 4 of the cell structure 2. When forming the coating layer 6 by applying the coating material, it is preferable to adjust the thickness of the coating layer 6 by adjusting the amount of coating material applied using a tool such as a spatula while rotating the cell structure 2. This configuration allows adjustment of the thickness of the coating layer and provision of a honeycomb structure 1 with high dimensional accuracy.

The thickness of the coating layer 6 is not particularly limited, and may be appropriately determined depending on the dimensions of the honeycomb structure 1. It is necessary to form the coating layer 6 to such a thickness that the depression/protrusion portions 7 and/or the cut portions 8 on the outer wall 4 are completely covered. If the thickness of the coating layer 6 is unnecessarily increased, the effective area of the honeycomb structure 1 is decreased. The thickness of the coating layer 6 is preferably 0.5 to 10 mm. The term "thickness of the coating layer 6" used herein refers to the thickness of the coating layer 6 from the surface of the outer wall 4 to the surface of the coating layer 6 in a region other than the region in which the depression/protrusion portion 7 and/or the cut portion 8 is formed.

The material for the coating layer 6 used for the honeycomb structure 1 according to this embodiment is not particularly limited. A material including at least one compound selected from the group consisting of cordierite, alumina, mullite, zirconia, titania, silicon carbide, silicon nitride, aluminum titanate, and silica may be suitably used. The affinity between the cell structure 2 and the coating material for forming the coating layer 6 can be improved by appropriately selecting the material for the coating layer 6 corresponding to the material for the cell structure 2. In the honeycomb structure 1 according to this embodiment, the coating layer 6 formed of a material including cordierite, which is the same material as the cell structure 2, may be more suitably used.

The coating layer 6 used for the honeycomb structure 1 according to this embodiment may be formed by applying the coating material to the outer wall of the unfired cell structure and firing the coating material together with the unfired cell structure, or may be formed by applying the coating material to the outer wall of the fired cell structure and firing the coating material. The coating layer 6 may also be formed by applying the coating material to the outer wall of the fired cell structure and merely drying the coating material (i.e. unfired coating layer). When forming the coating layer by firing the coating material together with the unfired cell structure, the coating layer is more firmly secured to the outer wall. When forming the coating layer by applying the coating material to the outer wall of the fired cell structure and firing the coating material, the coating layer is more firmly secured to the outer wall, and the honeycomb structure exhibits extremely excellent dimensional accuracy. When forming the coating layer by merely drying the coating material, the honeycomb structure exhibits extremely excellent dimensional accuracy and can be produced at reduced cost.

In order to further improve the dimensional accuracy of the honeycomb structure 1, the outer circumferential surface of the coating layer 6 may be ground. For example, when forming the coating layer by applying the coating material to the outer wall of the unfired cell structure, the dimensional accuracy of the honeycomb structure may be decreased to some extent due to thermal deformation during firing. Therefore, the dimensional accuracy of the honeycomb structure 1 is improved by arbitrarily grinding the outer circumferential surface of the coating layer 6. The grinding method is not particularly limited. The outer circumferential surface of the coating layer 6 may be ground using a known method.

[2] Method of Producing Honeycomb Structure

One embodiment of a method of producing a honeycomb structure according to the present invention is described below in detail. The method of producing a honeycomb structure according to this embodiment includes forming a forming clay including a ceramic raw material to obtain a tubular cell structure having a partition wall partitioning a plurality of cells serving as fluid channels and an outer wall integrally formed with the partition wall, and applying a coating material including a ceramic raw material to the outer wall forming the cell structure to form a coating layer, the outer wall forming the cell structure being formed to have on its surface a depression/protrusion portion and/or a cut portion formed by partially removing the surface of the outer wall. Each step of the method of producing a honeycomb structure according to this embodiment is described below in detail.

In the method of producing a honeycomb structure according to this embodiment, a forming clay including a ceramic raw material for forming the cell structure is prepared. The forming clay may be obtained by adding additives such as a binder, a dispersant, a pore-forming agent, and a surfactant, water as a solvent, and the like to a powder of a ceramic raw material such as cordierite, and mixing and kneading the components.

As examples of the binder, hydroxypropylmethyl cellulose, methyl cellulose, hydroxyethyl cellulose, carboxymethyl cellulose, polyvinyl alcohol, polyethylene terephthalate, and the like can be given. As examples of the dispersant, ethylene glycol, dextrin, fatty acid soap, polyalcohol, and the like can be given. As examples of the pore-forming agent, graphite, coke, flour, starch, a foamed resin, a water-absorbing resin, a phenol resin, polyethylene terephthalate, a fly-ash balloon, silica gel, an organic fiber, an inorganic fiber, a hollow fiber, and the like can be given. These additives may be used either individually or in combination of two or more depending on the objective.

It is preferable to add water to the forming clay in an amount of about 10 to 40 parts by mass for 100 parts by mass of the mixed raw material powder of the ceramic raw material and the additives optionally added.

The resulting forming clay is formed to obtain a tubular cell structure having a partition wall and an outer wall. As an example of the forming method, extrusion can be given. The forming clay may be formed using a vacuum kneading machine, a ram extruder, a twin-screw continuous extruder, or the like.

In the method of producing a honeycomb structure according to this embodiment, in order to obtain an outer wall provided with a cut portion formed by partially removing the outer wall as the outer wall forming the cell structure, the cut portion may be formed by at least partially removing the outer wall forming the cell structure by reducing the amount of forming clay supplied to part of a portion forming the outer wall (outer wall forming portion) or blocking the flow of the forming clay in a forming die used during forming. When forming the cut portion in this manner, the cell structure is formed while reducing the amount of forming clay corresponding to the cut portion in comparison with the case of forming a cell structure having a normal outer wall (i.e. outer wall which does not have a cut portion). According to this configuration, a cell structure can be advantageously obtained in which a cut portion is formed by at least partially removing the outer wall. As the method of producing a cell structure in which the cut portion is formed, a method may be utilized which reduces the cross-sectional area of the raw material flow channel corresponding to the outer wall extrusion portion, for example. Or, the cut portion may also be formed on the outer wall by blocking the flow of the raw material (forming clay) in the outer circumferential portion of the forming die using a retaining plate (or ring) or the like. Moreover, a secondary effect of suppressing the cutting of the outer wall when firing the cell structure can be obtained by partially removing the outer wall using the method of producing a honeycomb structure according to this embodiment. When forming a quadrangular cell structure, the cutting suppressing effect is particularly increased by partially removing the outer wall in the diagonal direction of the partition wall. This is because the cut portion of the outer wall releases stress occurring in the outer wall during shrinkage due to firing. This effect is also achieved for a structure including square cells such as a structure including octagonal cells and quadrangular cells in combination. The cutting method is not particularly limited. It is preferable to employ a method in which the outer wall is removed over the total length of the cell structure in the diagonal direction of the partition wall over a wide range in the circumferential direction of the outer wall, or a method in which the outer wall is removed in the shape of slits over the total length of the cell structure in a narrow range between adjacent partition walls contacting the outer wall. When removing the outer wall in the shape of slits, the effect is further increased by intermittently and adjacently disposing the slits in the circumferential direction.

As examples of the form of the cut portion on the outer wall, various forms can be given, such as a form in which the outer wall is widely removed in the diagonal direction of the partition wall over the total length of the cell structure or a form in which the outer wall is narrowly removed in the shape of slits. Note that the form of the cut portion is not particularly limited.

In the method of producing a honeycomb structure according to this embodiment, after forming a cell structure having a normal outer wall (i.e. outer wall which does not have a cut portion), the surface of the outer wall may be processed to form depression/protrusion portions having a shape such as protrusions, depressions, or splits or depression/protrusion portions in the shape of grooves. The processing method is not particularly limited. The cut portions may be formed by partially removing the outer wall of the cell structure using a grinding wheel, a tool, a chisel, a plane, a spatula, or the like. When forming the cell structure, the outer diameter of the outer wall is determined using a ring (retaining ring) which retains the forming die. In this case, depressions/protrusions may be formed on the inner side of the retaining ring, and depression/protrusion portions having a shape following the depressions/protrusions may be formed on the outer wall by causing the raw material (forming clay) to flow along the depressions/protrusions. The depression/protrusion portions may also be formed by sand-blasting the surface of the outer wall.

A coating material including a ceramic raw material is applied to the partition wall forming the cell structure to form a coating layer. The coating material for the coating layer may be prepared using various known methods. For example, the coating material may be prepared according to a method disclosed in JP-A-5-269388. As the method of forming the coating layer by applying the coating material, a method of applying the coating material to the outer wall using a tool such as a spatula while rotating the cell structure 2 can be given. The end faces of the cell structure 2 are held using a guide jig having an outer diameter larger than the outer diameter of the cell structure, the cell structure is rotated so that a spatula is positioned along the outer circumferential surface of the guide jig, and the coating material is injected into the space between the outer circumferential surface of the cell structure and the spatula to form the coating layer on the outer circumferential surface of the cell structure. Or, the cell structure 2 is disposed at the center of a cylindrical container having an inner diameter larger than the outer diameter of the cell structure 2, and the coating material is injected into the space between the cylindrical container and the cell structure 2, as disclosed in another related art. According to the above method, the thickness of the coating layer can be controlled, and a honeycomb structure with high dimensional accuracy can be obtained. The step of forming the coating layer may be performed after drying and firing the resulting cell structure, or may be performed in a state in which the resulting cell structure has not been fired.

The cell structure and the coating layer are then dried. When forming the coating layer by applying the coating material after firing the cell structure, the following step is performed for only the cell structure. The cell structure and the coating layer may be dried using various methods. As example of the drying method, hot-blast drying, microwave drying, dielectric drying, drying under reduced pressure, vacuum drying, freeze drying, and the like can be given. It is preferable to use at least one drying method selected from the group consisting of dielectric drying, microwave drying, and hot-blast drying. It is preferable to dry the cell structure and the coating layer at 30 to 150° C. for one minute to two hours. After drying the cell structure and the coating layer, the end faces of the cell structure are optionally removed to a specific length.

The cell structure and the coating layer (only the cell structure when forming the coating layer after firing) are fired by heating the cell structure and the coating layer at a specific temperature. As the firing conditions, optimum conditions may be appropriately set depending on the type of raw material powder used for the forming clay and the like. For example, it is preferable to fire the cell structure and the coating layer at 1350 to 1450° C. for 1 to 20 hours in air. According to the above configuration, a honeycomb structure can be obtained which includes a cell structure having a partition wall partitioning a plurality of cells serving as fluid channels and an outer wall integrally formed with the partition wall, and a coating layer disposed to cover the outer wall forming the cell structure.

When forming the coating layer after firing the cell structure, the coating material is applied to the fired cell structure using the above method to form a coating layer. The resulting coating layer may be fired, or may be dried without firing the coating layer.

When forming a honeycomb structure in which the openings of specific cells are plugged using plugging sections, a plugging slurry used as the raw material for the plugging section is prepared, and the openings of the specific cells are filled with the plugging slurry before or after firing to form plugging sections. The step of forming the plugging sections may be performed according to a known method of producing a honeycomb structure.

EXAMPLES

The present invention is described below in detail by way of examples. Note that the present invention is not limited to the following examples.

Example 1

Figure 6:
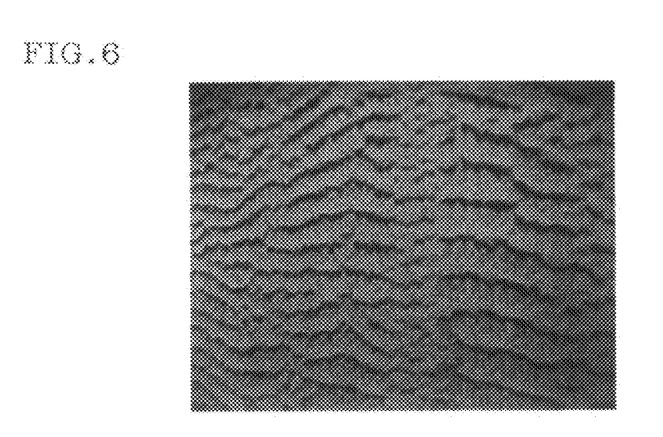
FIG. 6 is a photograph of the surface of a cell structure obtained in Example 1.

A cordierite raw material containing talc, kaolin, and alumina as the main raw ingredients was mixed with water, a binder, a surfactant, and the like. The components were dispersed/mixed and kneaded to obtain a forming raw material. The forming raw material was extruded in the shape of a column using a kneading machine, and then extruded using an extruder to obtain a tubular cell (honeycomb) formed product having a partition wall partitioning a plurality of cells serving as fluid channels and an outer wall integrally formed with the partition wall. A honeycomb structure was produced using the resulting formed product. Specifically, the resulting formed product was dried and cut to a specific length to obtain a dried product. After alternately plugging the cells on each end face of the dried product, the resulting product was fired to obtain a fired product. In this example, the outer wall was provided with cut portions by reducing the amount of forming clay for the outer wall forming portion in a forming die when extruding the cell structure. The cell structure was in the shape of a column with a diameter of 144 mm and a total length of 152 mm. The thickness of the partition wall was 0.15 mm (6 mils), the cell density was about 62 cells/cm$^2$ (400 cells/in$^2$), and the porosity after firing was 35%. Note that one mil is one thousandth of inch (i.e. 0.0254 mm). The shape of the cut portions on the surface of the cell structure thus obtained was determined. FIG. 6 is a photograph of the surface of the cell structure obtained in Example 1.

A coating material containing a ceramic raw material was applied to the outer wall forming the cell structure using a spatula to form a coating layer to produce a honeycomb structure according to this example. The resulting honeycomb structure was subjected to measurements and evaluations of various property values given below. The measurement and evaluation results are shown in Table 1.

TABLE 1

|  | Example 1 | Example 2 | Comparative Example 1 | Comparative Example 2 |
|---|---|---|---|---|
| Coatability of coating layer | Good | Good | — | Bad |
| External diametrical shape accuracy | Good | Excellent | Fair | Good |
| Isostatic breaking strength test | Excellent to Good | Excellent to Good | Good | Excellent to Good |
| Separation of coating layer | Good | Good | — | Bad |
| Contact pressure test during canning | Good | Excellent | Fair | Good |

[Coatability of Coating Layer]

Coatability when applying the coating material to the outer wall forming the cell structure (coatability of coating layer) was evaluated by naked eye outward appearance observation. The coatability was evaluated according to the following two-rank standard.

Bad: Separation occurred after application.

Good: Separation did not occur after application.

[Accuracy of External Diametrical Shape]

The accuracy of the external diametrical shape of the honeycomb structure as the final product was evaluated. The difference from the target shape was measured using calipers, and the accuracy was evaluated according to the following three-rank standard.

Fair: The honeycomb structure exhibited poor accuracy to some extent.

Good: The entire honeycomb structure exhibited good accuracy.

Excellent: The entire honeycomb structure exhibited very good accuracy.

[Isostatic Breaking Strength Test]

A carrier was placed in a tubular container made of rubber, and the honeycomb structure as the final product was placed in the container. After covering the container with an aluminum plate, the honeycomb structure was subjected to isotropic compression in water. The pressure at which the honeycomb structure broke was measured to evaluate isostatic breaking strength. The term "isostatic breaking strength" is defined in the automobile standard JASO-M505-87 published by the Society of Automotive Engineers of Japan. The isostatic breaking strength was evaluated according to the following three-rank standard.

Fair: The honeycomb structure exhibited poor isostatic breaking strength to some extent.

Good: The entire honeycomb structure exhibited good isostatic breaking strength.

Excellent: The entire honeycomb structure exhibited very good isostatic breaking strength.

[Separation of Coating Layer]

Separation of the coating layer from the honeycomb structure as the final product was evaluated by naked eye outward appearance inspection after electric furnace spalling at 650° C. for one hour. Separation was evaluated according to the following two-rank standard.

Bad: Separation partially occurred.

Good: Separation did not occur.

[Contact Pressure Test During Canning]

When inserting the honeycomb structure as the final product into a metal container through a ceramic mat, a contact pressure test during canning was conducted in which the contact pressure distribution was measured when inserting the honeycomb structure in a state in which pressure-sensitive paper was placed between the outer circumferential surface of the honeycomb structure and the mat. The pressure-sensitive paper becomes red at a position at which a high contact pressure occurs. The contact pressure may also be measured using a method utilizing a contact-resistance-type contact pressure measurement sheet. The contact pressure was evaluated according to the following three-rank standard.

Fair: The contact pressure was high at some points.
Good: The entire honeycomb structure exhibited uniform contact pressure.
Excellent: The entire honeycomb structure exhibited very uniform contact pressure.

The honeycomb structure according to Example 1 exhibited excellent results for "coatability of coating layer", "accuracy of external diametrical shape", "isostatic breaking strength test", "separation of coating layer", and "contact pressure test during canning".

Example 2

A honeycomb structure configured in the same manner as the honeycomb structure according to Example 1 was obtained, and the outer circumferential surface (outer circumferential surface of the coating layer) of the honeycomb structure was ground to obtain a honeycomb structure according to Example 2. The resulting honeycomb structure was subjected to measurements and evaluations of various property values in the same manner as in Example 1. The measurement and evaluation results are shown in Table 1. The honeycomb structure according to Example 2 exhibited particularly excellent external diametrical shape accuracy.

Comparative Example 1

A honeycomb structure according to Comparative Example 1 which was not provided with a coating layer was produced using a known production method. Specifically, a cell structure in which a depression/protrusion portion and/or a cut portion was not formed on an outer wall was obtained by supplying a normal amount of forming clay for an outer wall forming portion in a forming die when extruding the cell structure, and the resulting cell structure was dried and fired to obtain the honeycomb structure. The resulting honeycomb structure was subjected to measurements and evaluations of various property values in the same manner as in Example 1. The measurement and evaluation results are shown in Table 1. The honeycomb structure according to Comparative Example 1 exhibited poor external diametrical shape accuracy and also showed poor results in the contact pressure test during canning.

Comparative Example 2

A honeycomb structure configured in the same manner as the honeycomb structure according to Comparative Example 1 was obtained. A coating material was applied to the surface of the outer wall in the same manner as in Example 1 to form a coating layer to obtain a honeycomb structure. The resulting honeycomb structure was subjected to measurements and evaluations of various property values in the same manner as in Example 1. The measurement and evaluation results are shown in Table 1. The honeycomb structure according to Comparative Example 2 suffered from separation after application with regard to the coatability of the coating layer, and partially suffered from separation with regard to separation of the coating layer.

Examples 3 to 7

Figure 7:
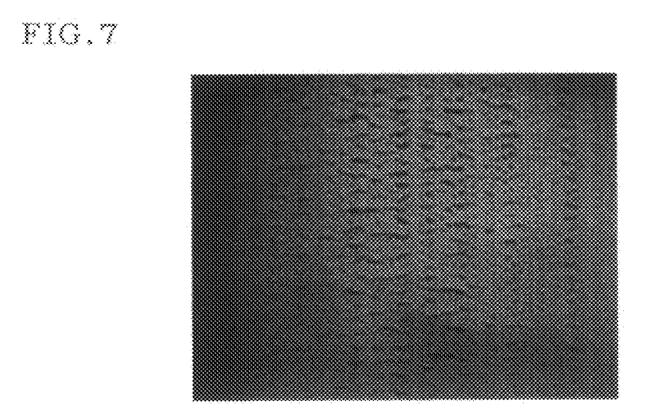
FIG. 7 is a photograph of the surface of a cell structure obtained in Example 3.
Figure 8:
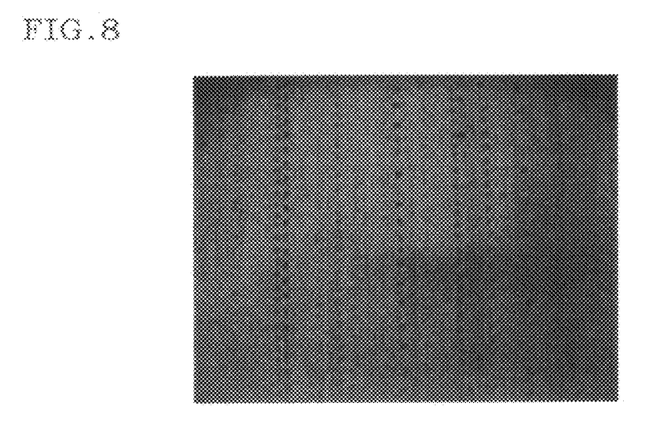
FIG. 8 is a photograph of the surface of a cell structure obtained in Example 4.
Figure 9:
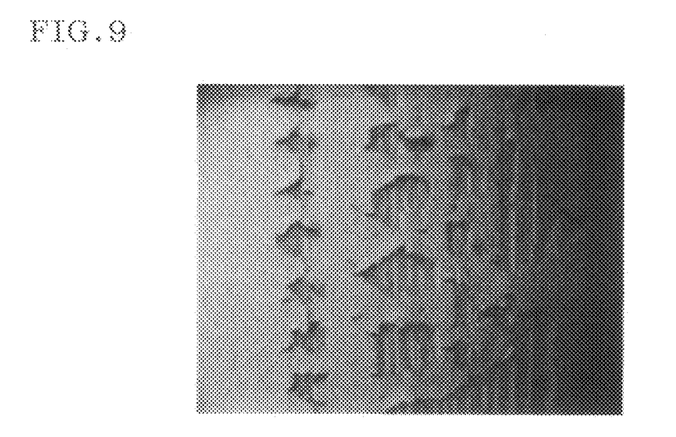
FIG. 9 is a photograph of the surface of a cell structure obtained in Example 5.
Figure 10:
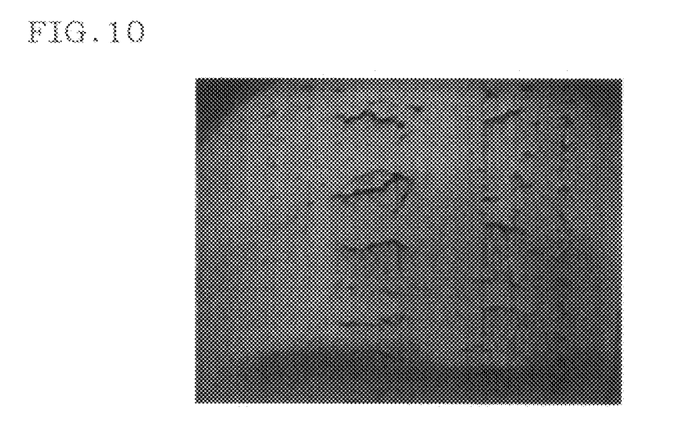
FIG. 10 is a photograph of the surface of a cell structure obtained in Example 6.
Figure 11:
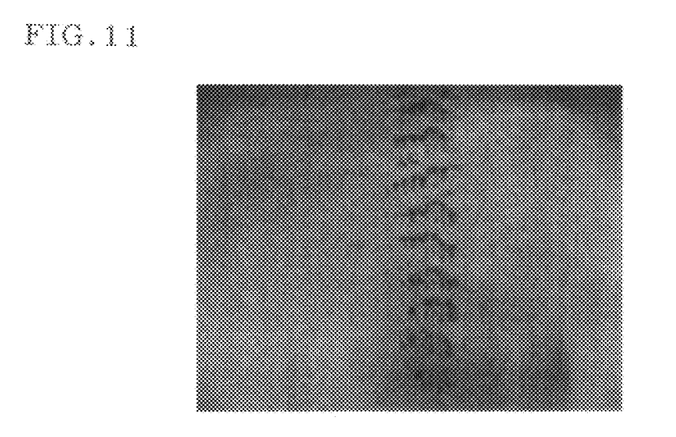
FIG. 11 is a photograph of the surface of a cell structure obtained in Example 7.

Honeycomb structures (Examples 3 to 7) were produced in the same manner as in Example 1 except for forming cell structures provided with cut portions of different shapes by changing the percentage of reducing the amount of forming clay for the outer wall forming portion when extruding the cell structure. The shape of the cut portions on the surface of the cell structure obtained by extrusion was determined. FIG. 7 is a photograph of the surface of the cell structure obtained in Example 3, FIG. 8 is a photograph of the surface of the cell structure obtained in Example 4, FIG. 9 is a photograph of the surface of the cell structure obtained in Example 5, FIG. 10 is a photograph of the surface of the cell structure obtained in Example 6, and FIG. 11 is a photograph of the surface of the cell structure obtained in Example 7. The resulting honeycomb structures were subjected to measurements and evaluations of various property values in the same manner as in Example 1. These honeycomb structures exhibited excellent results for each measurement and evaluation in the same manner as in Example 1.

Example 8

A cell structure with cut portions formed on the outer wall was obtained in the same manner as in Example 1. The cell structure was in the shape of a column with a diameter of 144 mm and a total length of 152 mm and had a partition wall thickness of 0.30 mm (12 mils), a cell density of about 46.5 cells/cm$^2$ (300 cells/in$^2$), and a porosity after firing of 65%. A coating material containing a ceramic raw material was applied to the outer wall of the cell structure to form a coating layer. The cells on the end faces of the cell structure were plugged in a staggered pattern to obtain a honeycomb structure in which the openings of the cells were plugged. The resulting honeycomb structures were subjected to measurements and evaluations of various property values in the same manner as in Example 1. The honeycomb structures exhibited excellent results for each measurement and evaluation in the same manner as in Example 1.

Example 9

A honeycomb structure was produced which had a quadrangular cell cross-sectional shape, a partition wall thickness of 0.30 mm (12 mils), and a standard cell density of 46.5 cells/cm$^2$ (300 cells/in$^2$). The external shape after forming a coating layer was a column (outer diameter: 191 mm, length: 203 mm), and the plugging depth was 10 mm.

Examples 10 and 11

A honeycomb structure was produced in the same manner as in Example 9 which had a quadrangular cell cross-sectional shape, a partition wall thickness of 0.30 mm (12 mils), and a standard cell density of 31 cells/cm$^2$ (200 cells/in$^2$). The honeycomb structure obtained in Example 10 had a columnar external shape (outer diameter: 229 mm, length: 305 mm) after forming the coating layer, and the honeycomb structure obtained in Example 11 had a columnar external shape (outer diameter: 460 mm, length: 500 mm) after forming the coating layer.

The honeycomb structures according to Examples 9 to 11 had a porosity of 45 to 70%, an average pore size of 5 to 30 μm, and an axial average thermal expansion coefficient at 40 to 800° C. of about 0.1 to 1.0×10$^{-6}$/° C. Honeycomb structures with an outer diameter of 191 to 460 mm could be produced using the same raw material as in Example 10 which had an octagonal/quadrangular cross-sectional cell shape, a partition wall thickness of 0.41 mm, a standard cell density of 300 cpsi (46.5 cells/cm$^2$).

In the honeycomb structure according to the present invention, the coating layer is firmly secured to the outer wall forming the cell structure so that separation of the coating layer is effectively prevented. Therefore, the honeycomb structure according to the present invention is suitable as a DPF or a catalyst carrier.

What is claimed is:

1. A honeycomb structure comprising:
   a cell structure having a porous partition wall partitioning a plurality of cells serving as fluid channels and an outer wall integrally formed with the partition wall, a surface of the outer wall having a depression/protrusion portion and/or a cut portion that is formed concurrently with formation of the cell structure by partially removing the surface of the outer wall; and
   a coating layer disposed on the surface of the outer wall covering and engaging the depression/protrusion and/or cut portion so that the coating layer is firmly secured to the surface of the outer wall preventing separation therefrom, the coating layer being formed by applying a coating material including ceramic raw material to the surface of the outer wall.

2. The honeycomb structure according to claim 1 wherein the depression/protrusion portion and/or the cut portion on the surface of the outer wall has a depth of 0.1 to 5 mm.

3. The honeycomb structure according to claim 1 wherein the cell structure is formed of a material including cordierite.

4. The honeycomb structure according to claim 1 wherein the coating layer has a thickness of 0.5 to 10 mm.

5. The honeycomb structure according to claim 1 wherein the coating layer includes at least one compound selected from the group consisting of cordierite, alumina, mullite, zirconia, titania, silicon carbide, silicon nitride, aluminum titanate, and silica.

6. The honeycomb structure according to claim 1 wherein the coating layer has a ground outer circumferential surface.

* * * * *